(12) United States Patent
Kozári et al.

(10) Patent No.: US 6,309,685 B1
(45) Date of Patent: Oct. 30, 2001

(54) PROCEDURE AND INSTRUMENT FOR THE QUICK PICKLING OF MAINLY MEAT

(76) Inventors: József Kozári, Lépcsösor u.1, H-8900 Zalaegerszeg; József Gyöngyösi, Harmat u. 10/b, H-6725 Szeged; Zoltán Gyöngyösi, Bartók Béla út 62, H-1113 Budapest; György Naszódi, Bánya u. 15, H-1214 Budapest, all of (HU)

( * ) Notice: Subject to any disclaimer, the term of this patent is extended or adjusted under 35 U.S.C. 154(b) by 0 days.

(21) Appl. No.: 09/486,605
(22) PCT Filed: Aug. 31, 1998
(86) PCT No.: PCT/HU98/00082
§ 371 Date: Mar. 1, 2000
§ 102(e) Date: Mar. 1, 2000
(87) PCT Pub. No.: WO99/11138
PCT Pub. Date: Mar. 11, 1999

(30) Foreign Application Priority Data

Sep. 1, 1997 (HU) .................................................. 97 01457
Aug. 7, 1998 (HU) .................................................. 98 01842

(51) Int. Cl.$^7$ ................................ A23B 4/015; A23L 3/30
(52) U.S. Cl. ............................. 426/238; 426/281; 99/451
(58) Field of Search .................................... 426/238, 281; 99/451

(56) References Cited

U.S. PATENT DOCUMENTS 3,743,523  *  7/1973  Bodine ................................. 426/238
4,353,928     10/1982  Seliger et al. .

FOREIGN PATENT DOCUMENTS

| 195 32 782 | 3/1997 | (DE) . |
| 1 561 185 | 2/1980 | (GB) . |
| 1717063 | * 3/1992 | (SU) . |
| 90/05458 | 5/1990 | (WO) . |
| 92/18011 | 10/1992 | (WO) . |
| 95/18537 | 7/1995 | (WO) . |
| WO 97/14314 | * 4/1997 | (WO) . |

* cited by examiner

Primary Examiner—Nina Bhat
(74) Attorney, Agent, or Firm—Venable; Gabor J. Kelemen

(57) ABSTRACT

A method for quick pickling of products primarily meat products is provided wherein the meat or other material to be pickled is placed into a pickling solution bath, then the solution is vibrated by ultrasound controlled by periodically repeating pulses having a space facto of 50–99% to assist in the penetration of the solution. The process includes using the ultrasound having a 30–34 kc/s frequency controlled by periodically preparing pulses of repetition frequency smaller than 10 c/s and of a space factor of 50–99%, the treatment takes 4–80 minutes depending on the mass of the pieces to be pickled. The apparatus for providing the pickling treatment includes a pickling tank, which is in cooperative relationship with one or more ultrasound sources coupled to an ultrasonic generator.

11 Claims, 2 Drawing Sheets

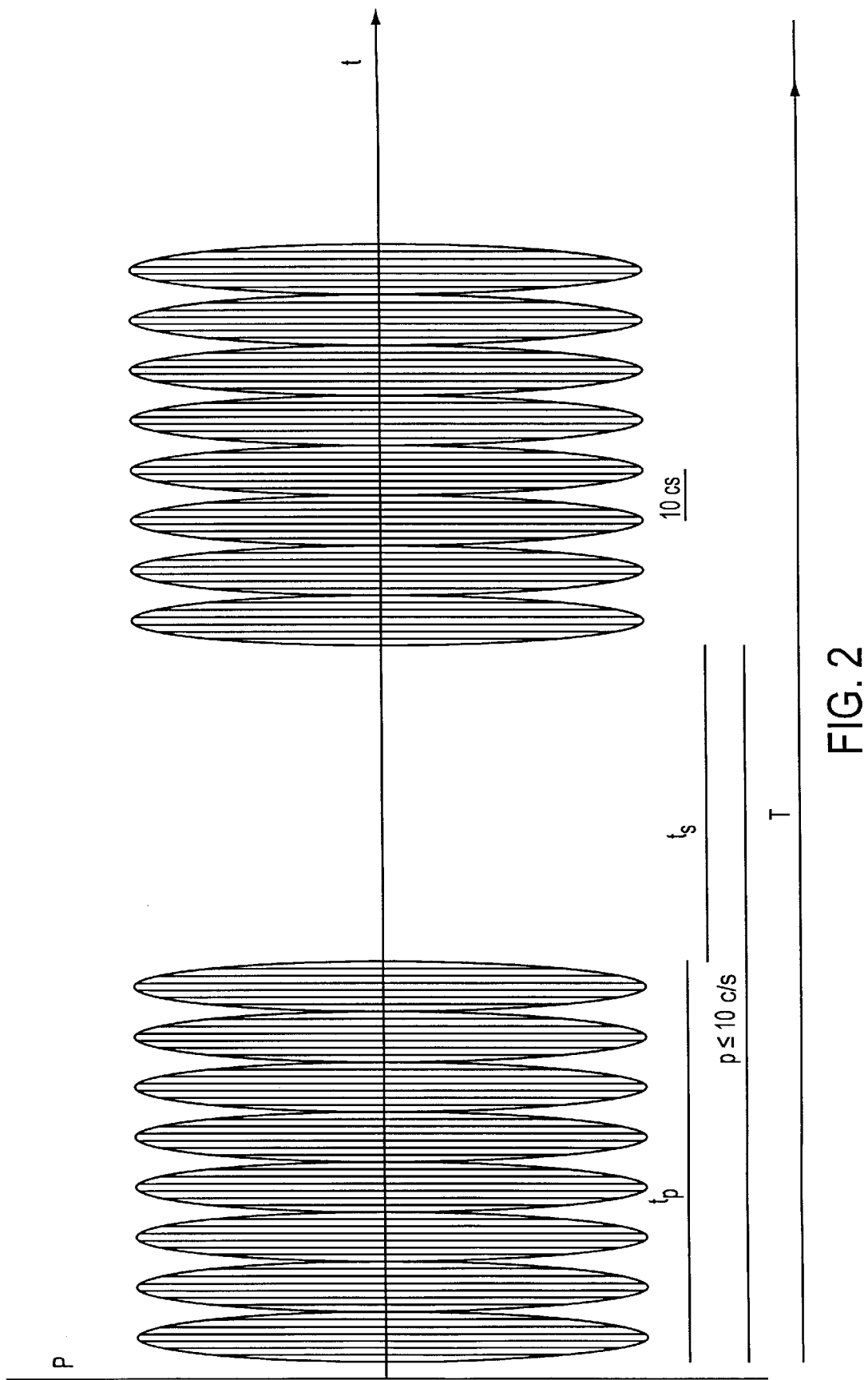

PROCEDURE AND INSTRUMENT FOR THE QUICK PICKLING OF MAINLY MEAT

CROSS REFERENCE TO RELATED APPLICATIONS

This application claims benefit under 35 U.S.C. 371 of the following applications: Application No. P9701457 of Hungary filed Sep. 1, 1997; application No. P9801842 of Hungary filed Aug. 7, 1998; and international application No. PCT/HU98/00082 filed Aug. 31, 1998.

The invention relates to a procedure for the quick pickling of mainly meat in which the meat or other material to be pickled is placed into a pickle solution bath and, in order to assist the penetration of pickling solution into the material to be pickled, the pickle solution is treated by ultrasound. The invention also relates to the instrument for carrying out the said procedure.

BACKGROUND OF THE INVENTION

Aromatizing, preserving and colour-forming substances are introduced into meat to be pickled. These aromatizing and colour-forming substances are generally NaCl (salt) or different mixtures of dilute aqueous solutions of nitrite salt mixtures (e.g. sodium ascorbate). The salt solutions thus prepared having different compositions are called "pickling solutions". By applying well-chosen pickling solutions, well-tasting, good-coloured and non-perishable meat products can be obtained.

For introducing the pickling solution into the meat tissue, pickling instruments are applied. The requirement for pickling instruments is that the pickling solution should be introduced into the meat tissue uniformly, under mild conditions (without destruction of the muscle fibres), well distributed and in the possible shortest time.

According to the traditional way of pickling, the meat to be pickled is placed into an open pickling bath and so much pickling solution is poured on it that the meat is fully covered. The pickling solution diffuses this way into the meat tissue in several days. In the case of products with skin, this time can even exceed a month. Though, in this procedure, the penetration of pickling solution is mild, due to its long duration the procedure is not economic enough, thus it is not suitable for industrial application. Another drawback of this procedure is that it may cause local oversalting and surface sintering.

In a newer procedure (see article "Metalquimia" in Hús, 1944, 1, p. 27) pickling solution is injected into the meat by an instrument provided with several parallelly arranged injection syringe. With this procedure, a relatively uniform and quick pickling can be performed, but the pickling solution leaks out for about an additional hour from the openings caused by injection, and the pricks are seen in the meat.

There are procedures and instruments known in which mechanical force is applied on the meat to be pickled, the pickling solution is thus introduced. In such instruments the meat pieces thrown on each other are rotated in the same time when adding the pickling solution, and as a result of this mechanical effect, the surface of meat pieces is loosened, gets spongy, and it absorbs the pickling solution on the surface. In this way, pickling needs a time of about 10–14 hours, which period is divided into operation and rest time. A drawback of this procedure is that it destructs the meat tissue and cannot be carried out in a continuous mode of operation.

In patent WO92/19011 PCT is this method developed further in that that the mechanical effect of rotation is complemented by ultrasound vibration originating from a tubular ultrasound source introduced into a closed tank. The frequency of the ultrasound used is 22–29 kc/s, its power is 0–400 W. The closed tank is exposed alternately to vacuum and a gas containing $CO_2$. In the meantime, the closed tank is cooled by a cooling jacket. The energy requirement of this method is high, and it is very complicated, thus very costly. It requires complementary instruments such as a vacuum pump, air compressor, cooling water pump and their appliances. The complicated instrument requires much place, it is immobile, and it is not applicable in satisfying smaller gastronomic demands.

In an earlier invention of the inventors of the present invention is described in Hungarian patent 212372. The quick pickling instrument consists of an open tank with a tray immersing into it, and the whole system is fitted on a self-supporting carcass. On the outer bottom side of the tank ultrasound sources are fixed. These ultrasound transducers are operated by a generator of 34–39 kc/s frequency. The operating parts of the instrument are cooled by a ventilator. Bigger or smaller meat pieces are immersed into the pickling solution by placing them on the tray in the open tank, then they are treated continuously with the ultrasound energy of 34–39 kc/s. This way, significantly shorter times of pickling can be achieved as compared to the traditional method. However, a further shortening of pickling times is required in producing pickled meat and other products of desired substance.

SUMMARY OF THE INVENTION

The object of the present invention is to eliminate the above shortcomings by developing a procedure and instrument for the quick pickling of mainly meat products by realizing tissue- destruction-free pickling in a shorter time and with a longer life-time of the instrument.

The basis for the invention is the experience that ultrasound waves falling into the frequency range of 30–34 kc/s accelerate most the penetration of pickling solution into the meat tissue, and on the other hand, that inserting frequent periodic spaces into the ultrasound treating, not only the life-time of the instrument can be lengthened, but also the introduction of pickling solution into the meat tissue can be further accelerated.

The solution of the task according to the invention is a procedure for the quick pickling of mainly meat products, wherein the meat or other material to be pickled is placed into the pickling bath, then the bath is treated by ultrasound to accelerate the penetration of pickling solution into the meat, in which procedure periodically repeating ultrasound controlled by pulses of space factor of 50–99% is applied.

As ultrasound source, preferably periodical, power-modulated ultrasound is used.

The frequency of the ultrasound is preferably between 30 and 34 kc/s.

Preferably, ultrasound waves are modulated by pulses of repeating frequencies lower than 10 c/s.

Pulse times $t_p$ and space times $t_s$ are preferably varied in function of the mass and tissue structure of the pieces to be pickled.

Ultrasound treatments last expediently for 4–80 min, depending on the mass of the pieces to be pickled.

The invention thus consists of a procedure for the quick pickling of meat products, wherein meat pieces are immersed into a pickling bath which is vibrated by ultrasound to assist the penetration of the pickling solution into the meat, in which procedure 30–34 kc/s ultrasound waves controlled by periodically repeated pulses of space factor of 50–99% and of a repeating frequency smaller than 10 c/s are applied for a time of 4–80 min depending on the mass of the individual pieces of the material to be pickled.

The invention also relates to an instrument for pickling of mainly meat consisting of a pickling tank provided with one or more ultrasound sources that are connected to an ultrasound generator of appropriate power, which is a periodically operating ultrasound generator of 30–34 kc/s frequency, of a repeating frequency smaller than 10 c/s and of a space factor smaller than 100% but at least 50%.

Preferably, the parameters pulse times and space times of the generator are programmable.

Expediently, the ultrasound generator is provided by a timer for the treating period.

BRIEF DESCRIPTION OF THE DRAWINGS

In what follows, the essence of the invention is described in detail on the basis of a drawing for an embodiment.

FIG. 2 shows the arrangement of ultrasound waves.

DETAILED DESCRIPTION OF THE INVENTION

Figure 1:
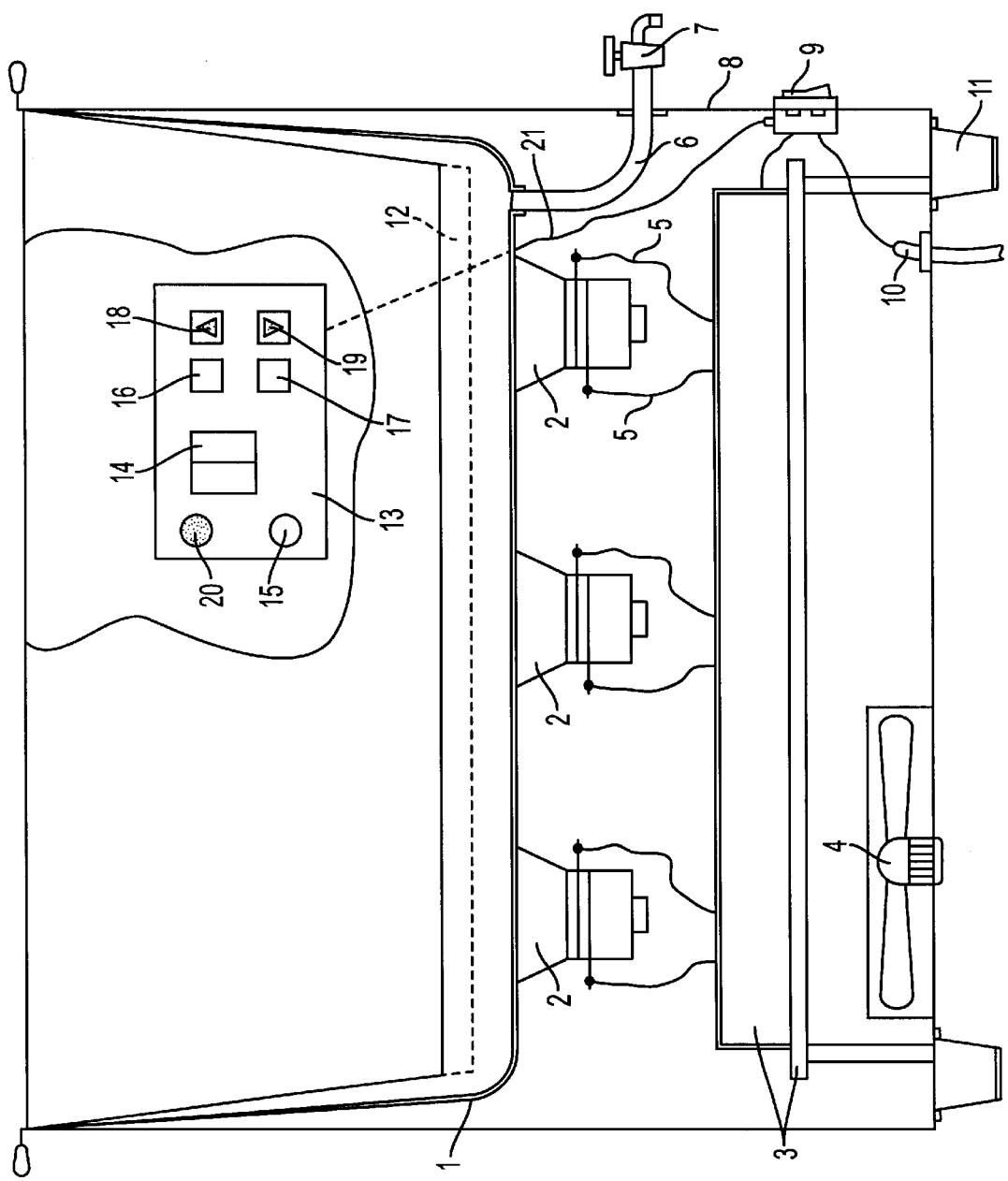
FIG. 1 is a scheme of the side-view of the instrument for the quick pickling of meat.

In FIG. 1, at the bottom of pickling tank 1, six pieces of ultrasound sources 2 are fixed, to which ultrasound sources 2 ultrasound generator 3 is connected by flexible cables 5. On the bottom of pickling tank 1, discharge pipe 6 to be closed by cock 7 is to be found. The cooling of the instrument is ensured by ventilator 4. The instrument has mains connection 10 and main switch 9 for the connection of the instrument to the electric network. pickling tank 1 and ultrasound generator 3 are placed onto carcass 8 provided with anfivibration stands 11. In pickling tank 1, immersing tray 12 is arranged in a way it can be lifted out.

Ultrasound generator 3 is connected to program unit 13 placed after main switch 9 via flexible cable 21, which program unit 13 contains adjusting and indicating devices, such as operating time indicator 14, operation indicator 15, starter/program selection 16, stop/program stepper 17, parameter increasing button 18, parameter decreasing button 19 and sound signal 20.

The ultrasound sources 2 are, in this embodiment, piezoelectric transformers with ceramic body, which are fixed to the outer bottom surface of pickling tank 1 through a resonator, and they let the stainless steel bottom plate of tank 1 vibrate.

Ultrasound generator 3 is a power generator operating in the frequency is range of 30–34 kc/s having a nominal ultrasound power of about 300 W. This ultrasound generator 3 has an oscillator, a pulse generator and a tuned power amplifier, said power amplifier having the piezoelectric ultrasound sources 2 as part of its tuned circuit, and input signals of 30–34 kc/s of which are periodically prohibited by the pulses of the pulse generator. By program unit 13, the pulse time ($t_p$) and space time ($t_s$) of the output signal of the pulse generator can be adjusted independently of each other, but depending on technological requirements (e.g. mass and tissue structure of meat pieces, corresponding to experimental values) in such time periods that the repetition frequency p of pulses does not exceed 10 c/s. The supply power of ultrasound generator 3 is full wave rectified mains voltage, thus ultrasound sources 2 are operated by half-periodically increasing and decreasing power in individual pulse times $t_p$, thus the ultrasound signal is power-modulated, which improves the efficiency of pickling.

FIG. 2 shows the complex signal thus generated which is a signal package consisting of packages of ultrasound signals of 30–34 kc/s frequency, modulated by 10 c/s, of pulse times of $t_p$ and space times $t_s$ between them, with periods p of a repetition frequency lower than 10 c/s and a pickling time T.

Programming of ultrasound generator 3 occurs by program unit 13, e.g. according to the following: After placing the meat, program unit 13 is connected into the mains by using switch 9, the switched-in state is continuously indicated by operation indicator 15 provided with a LED diode. By operating start/program selector 16, parameter T (pickling time) is chosen (FIG. 2), then by using parameter-increasing and decreasing buttons 18 and 19, the period between 4 and 80 (maximum 99) minutes is adjusted which is indicated on time indicator 14. By pressing stop/program stepping button 17, we change to the next parameter, e.g. pulse time, $t_p$ (FIG. 2), the value of which is adjusted by using increasing and decreasing buttons 18 and 19. By a repeated push on stop/program stepping button 17, we change again to the next parameter, e.g. spacetime $t_s$ (FIG. 2), the value of which is also programmed by using increasing and decreasing buttons 18 and 19. By pushing start/program selection button 16, ultrasound generator 13 and timing is started. The process can be interrupted by pushing stop/program selection button 17. Program unit 13 gives a supply voltage to ultrasound generator 3, which voltage is switched off at the end of pickling time T.

The invention relates mainly to the quick pickling of meat, but it is applicable for introducing flavouring ingredients and preserving substances into other materials as well, e.g. for diffusing substances into eggs through the egg-shell, or for treating vegetables.

During the procedure, meat or other material to be pickled is placed into a pickling bath, then the pickling solution is vibrated by ultrasound in order to assist the introduction of pickling solution into the material, by applying periodic, power-modulated ultrasound, by using ultrasound controlled by periodically repeated pulses of a space factor of 50–99 as modulated ultrasound. The frequency of ultrasound applied is preferably 30–34 kc/s. Ultrasound is modulated by pulses of a repetition frequency smaller than 10 c/s.

Ultrasound generates a large speed-difference between the pickling solution and the meat pieces thus causing an intense movement of the muscle fibres of the meat tissue. Muscle fibres get loose, an intensive diffusion takes place through cell membranes, thus the pickling solution penetrates the cells. The absorption of the pickling solution continues further intensively also during the periodically repeating space periods between the ultrasound packages.

Ultrasound treatment is performed for 4–80 min depending on the mass of pieces to be pickled.

In the procedure according to the invention the ultrasound impact is periodic, individual ultrasound packages of a given time lapse are periodically followed by spaces. Thus, in the fibres of the material to be treated a solution introducing and a relaxation period alternate by p vibration periods. Such an ultrasound treatment consisting of ultrasound packages of a pulse time $t_p$ and in-between relaxation times $t_s$ proved to be very efficient in increasing the penetration time and depth of the pickling solution, increasing, at the same time, also the uniformity of pickling.

The instrument according to the invention is suitable for realizing this procedure. The instrument operates as follows:

1 Pickling tank is filled up with pickling solution up to a certain level. The density of the pickling solution lies expediently between 16 and 26 Be° (Beaume grade). Meat pieces to be pickled are placed onto 12 dipping tray so that the pickling solution covers them. After placing the meat, ultrasound generator 3 controlled by program unit 13 is set to operation by using main switch 9.

Pickling of e.g. leg of pork cut into 80–150 g pieces is performed so that the meat pieces are placed on dipping tray 12, then the tray, together with the meat pieces, is placed into pickling tank 1. The tank 1 is filled up with the oily emulsion containing spices, which is the pickling solution, up to a level, where it reaches the meat pieces. Subsequently, the instrument is set to operation by main switch 9 (ventilator and ultrasound generator 3 controlled by program unit 13 is thereby started). Pickling time is set to 4 min, pulse time of ultrasound $t_p$, to 50 ms, space time, $t_s$ to 17 ms, then treatment with ultrasound energy of 30–34 kc/s is performed for 4 minutes without moving the meat. Termination of the process is marked by sound signal indicator 20. The instrument is switched off, and then the dipping tray is taken out of the tank together with the pickled meat pieces.

When pickling chunks of meat, e.g. the boned leg of pork of about 1.5 kg is placed on dipping tray 12, a little bit flattened, then the tray, together with the chunk of meat, is placed into the pickling tank. Tank 1 is filled up with the pickling solution consisting of an oily, spicy emulsion, up to a level where the meat is covered by the solution. Ultrasound treatment is carried out for 60 min so that during the treatment the chunk of meat is not moved. Pulse time $t_p$ is set to 75 ms, space time $t_s$, to 25 ms.

Pickling of the round of beef occurs so that the prepared boned meat of 1 kg is pickled for 70 minutes, pulse time $t_p$, is chosen for 99 ms, space time $t_s$, for 1 ms. The pickling solution can be reused.

According to our experience, the penetration depth of the pickling solution is largest, about 5 mm/min, at ultrasound frequencies of 30–34 kc/s, which is by orders of magnitude bigger than the 1 cm/10 h obtained by the traditional method.

The procedure according to the invention is also suitable to introduce materials insoluble in water into the meat tissue (e.g. the oily, spicy pickling emulsion). This feature can revolutionize gastronomic technology by the short pickling times of 4–6 minutes. A further advantage is that the substance of meat is not harmed, it gets even better, even esthetically. Another advantage is that a mass increase of 8–9% occurs due to the uptake of the pickling solution, which does not leave the meat later.

The advantage of the instrument according to the invention as compared to the known ultrasound instruments is that it does not require any complementary instruments (air compressor, vacuum pump and their appliances), thus it can be realized in simpler, less costly, small capacity, mobile forms as well. The lifetime of the ultrasound sources in function of operation time is longer, since periodic spaces are introduced in between the pulses.

What is claimed is:

1. A method for pickling a food material including the steps of:

placing the food material in a pickling solution;

coupling pulses of ultrasonic energy to the pickling solution with the food product in the solution; said pulses having a ratio of pulse time to time between pulses in a range between fifty percent (50%) and ninety percent (90%).

2. A method for pickling a food material as in claim 1 including the further step of modulating the ultrasonic energy of said pulse.

3. A method for pickling a food material as in claim 1 wherein said pulses of ultrasonic energy have a frequency in a range of 30–34 kc/s.

4. A method for pickling a food material as in claim 3 wherein said pulses of ultrasonic energy have a repetition frequency of less than ten cycles per second.

5. A method for pickling a food material as in claim 3 including the further step of modulating the ultrasonic energy of said pulse.

6. A method for pickling a food material as in claim 5 including the further step of adjusting the ratio of pulse time ($t_p$) to time between pulses ($t_s$) depending on the mass and tissue structure of the material to be pickled.

7. A method for pickling a food material as in claim 1 including the further step of adjusting the ratio of pulse time ($t_p$) to time between pulses ($t_s$) depending on the mass and tissue structure of the material to be pickled.

8. Apparatus for pickling food products comprising in combination;

a pickling tank;

an ultrasonic energy source coupled to said tank;

an ultrasonic signal generator coupled to said ultrasonic energy source;

a program unit coupled to said ultrasonic signal generator, said program unit controlling said ultrasonic signal generation to generate pulse signals with a ratio of pulse time to time between pulses in a range between fifty percent (50%) and ninety percent (90%).

9. Apparatus for pickling food products as in claim 8 wherein said ultrasonic energy source operates in a range between 30–34 kc/s.

10. Apparatus for pickling food products as in claim 9 wherein said pulse signals have a repetition frequency of less than ten cycles per second.

11. Apparatus for pickling food products as in claim 9 including means to modulate ultrasonic energy generated by the ultrasonic energy source.

\* \* \* \* \*